(12) United States Patent
Venezia

(10) Patent No.: US 10,611,208 B2
(45) Date of Patent: Apr. 7, 2020

(54) AIR FLOW CONTROL DEVICE AND VENTILATION, HEATING, OR AIR CONDITIONING UNIT

(71) Applicant: MAHLE International GmbH, Stuttgart (DE)

(72) Inventor: Vincenzo Venezia, Magstadt (DE)

(73) Assignee: MAHLE International GmbH, Stuttgart (DE)

( * ) Notice: Subject to any disclaimer, the term of this patent is extended or adjusted under 35 U.S.C. 154(b) by 147 days.

(21) Appl. No.: 15/182,828

(22) Filed: Jun. 15, 2016

(65) Prior Publication Data

US 2016/0368343 A1     Dec. 22, 2016

(30) Foreign Application Priority Data

Jun. 16, 2015   (DE) .................. 10 2015 211 039

(51) Int. Cl.
*B60H 1/00*     (2006.01)
(52) U.S. Cl.
CPC ..... *B60H 1/00064* (2013.01); *B60H 1/00678* (2013.01); *B60H 2001/00092* (2013.01); *B60H 2001/00721* (2013.01)
(58) Field of Classification Search
CPC ............ B60H 1/00457; B60H 1/00464; B60H 1/00471; B60H 1/247; B60H 1/24; B60H 1/00064; B60H 1/00678; B60H 2001/00092; B60H 2001/00721
USPC ..... 454/69, 139–142, 160–161, 126; 165/42, 165/43; 237/12.3 A
See application file for complete search history.

(56) References Cited

U.S. PATENT DOCUMENTS

| 5,109,755 | A | 5/1992 | Guillemin |
| 6,450,877 | B2 | 9/2002 | Tsurushima et al. |
| 8,376,819 | B2* | 2/2013 | Vincent .............. B60H 1/00028 165/42 |
| 2003/0042011 | A1 | 3/2003 | Vincent |
| 2005/0178538 | A1 | 8/2005 | Vincent |
| 2007/0017655 | A1 | 1/2007 | Mouri et al. |

(Continued)

FOREIGN PATENT DOCUMENTS

| CN | 1514780 A | 7/2004 |
| CN | 102653223 A | 9/2012 |

(Continued)

*Primary Examiner* — Steven B McAllister
*Assistant Examiner* — Ko-Wei Lin
(74) *Attorney, Agent, or Firm* — Muncy, Geissler, Olds & Lowe, P.C.

(57) ABSTRACT

An air flow control for a ventilation, heating, or air conditioning unit of a motor vehicle, having a housing with a cold air passage with a first inlet opening and with a hot air passage with a second inlet opening. At least one heating heat exchanger is disposed in the hot air passage in order to heat the air in the hot air passage with a mixing chamber for mixing a first partial air flow from the cold air passage and/or a second partial air flow from the hot air passage. The mixing chamber is disposed downstream of the hot air passage and of the cold air passage. A mixing flap substantially closes the first inlet opening. The housing downstream of the mixing chamber has a first outlet opening and at least one second outlet opening for the flowing of air out of the mixing chamber.

12 Claims, 5 Drawing Sheets

(56) References Cited

U.S. PATENT DOCUMENTS

| | | | | |
|---|---|---|---|---|
| 2010/0210201 A1* | 8/2010 | Dreisilker | ............... | B64D 13/02 454/74 |
| 2011/0005734 A1* | 1/2011 | Nanaumi | ............ | B60H 1/00064 165/122 |
| 2011/0117829 A1* | 5/2011 | Ikeda | ................. | B60H 1/00064 454/155 |
| 2014/0261822 A1* | 9/2014 | Haupt | .................... | F16K 47/045 137/803 |

FOREIGN PATENT DOCUMENTS

| | | | |
|---|---|---|---|
| DE | 4022932 A1 | 1/1991 |
| DE | 698 20 990 T2 | 6/2004 |
| DE | 602005003877 T2 | 12/2008 |
| DE | 60225979 T2 | 5/2009 |
| DE | 102010039674 A1 | 3/2012 |

* cited by examiner

AIR FLOW CONTROL DEVICE AND VENTILATION, HEATING, OR AIR CONDITIONING UNIT

This nonprovisional application claims priority under 35 U.S.C. § 119(a) to German Patent Application No. 10 2015 211 039.7, which was filed in Germany on Jun. 16, 2015, and which is herein incorporated by reference.

BACKGROUND OF THE INVENTION

Field of the Invention

The present invention relates to an air flow control device, and a ventilation, heating, or air conditioning unit.

Description of the Background Art

DE 698 20 990 T2, which corresponds to U.S. Pat. No. 6,450,877, discloses an air conditioning unit for a motor vehicle with an upstream side air passage, such as a cold air passage, and two downstream side air passages, branched off from the upstream side air passage, such as the cold air passage and hot air passage. In addition, the air conditioning unit has a mixing flap, by means of which the air flow can be supplied from the upstream side air passage optionally to one of the two downstream side air passages or in each case proportionally to both downstream side air passages. This disclosed air conditioning unit therefore has an air flow control device which is worthy of further improvement in regard to some of its aspects. This relates in particular to the linearization of the temperature control characteristic of the air mass flow, controlled by the mixing flap, as a function of the mixing flap opening degree. The division of the air flow into partial air flows with different temperatures at different air outlets is also often desirable for increasing the feeling of comfort of the vehicle passengers.

SUMMARY OF THE INVENTION

It is therefore an object of the invention to provide an air flow control device that has been improved further. Also, it is an object of the invention to provide a ventilation, heating, or air conditioning unit in which such an air flow control device can be used.

An exemplary embodiment of the invention relates to an air flow control device, in particular to a ventilation, heating, or air conditioning unit of a motor vehicle, having a housing with a cold air passage with a first inlet opening and with a hot air passage with a second inlet opening, whereby at least one heating heat exchanger is disposed in the hot air passage in order to heat the air in the hot air passage, with a mixing chamber for mixing a first partial air flow from the cold air passage and/or a second partial air flow from the hot air passage, whereby the mixing chamber is disposed downstream of the hot air passage and of the cold air passage, with a mixing flap, whereby the mixing flap in a first end position substantially closes the first inlet opening, whereby the housing downstream of the mixing chamber has a first outlet opening and at least one second outlet opening, for the flowing of air out of the mixing chamber, and with an air guide element disposed in the area of the mixing chamber, whereby the air guide element substantially extends through the mixing chamber and guides a third partial air flow from the cold air passage to the first outlet opening. This design form in an advantageous manner permits a colder air flow and at least one warmer air flow to flow out into the cabin of a motor vehicle simultaneously through different outlet openings and thereby to vary the temperature difference between the colder air flow and the at least one warmer air flow.

In an embodiment of the air flow control device, the air guide element can have a variable cross section in a first direction substantially perpendicular to the air flow direction.

In an embodiment of the air flow control device, the air guide element can have an upstream section and a downstream section and the air guide element in the area of its upstream section can have a decreasing cross section in the first direction substantially perpendicular to the air flow direction. A rather large amount of air can be captured as a result from the cold air passage and concentrated like a spot flow.

In an embodiment of the air flow control device, the air guide element can have an upstream section and a downstream section and the air guide element in the area of its downstream section can have a cross section that is substantially constant or widens or narrows in the first direction substantially perpendicular to the air flow direction.

In an embodiment of the air flow control device, the air guide element in an area of the mixing chamber can be disposed substantially perpendicular to the second partial air flow, flowing out of the hot air passage into the mixing chamber, or in the area of the mixing chamber that extends substantially perpendicular to the second partial air flow, flowing out of the hot air passage into the mixing chamber. As a result, the guiding of a cold air flow through the mixing chamber and through the second partial air flow flowing out of the hot air passage toward an outlet opening is facilitated.

In an embodiment of the air flow control device, the cold air passage can have a first cold air passage side and a second cold air passage side substantially opposite to the first cold air passage side.

In an exemplary embodiment of the air flow control device, the mixing flap can be disposed, mounted rotatable about an axis, in the area of at least one mounting point.

In an exemplary embodiment of the air flow control device, the at least one mounting point can be disposed in the area of the first cold air passage side. This allows for stepless regulation of the mixing ratio of hot air and cold air in the mixing chamber.

In an embodiment of the air flow control device, the air guide element can be disposed in the area of the second cold air passage side and/or in an extension of the second cold air passage side. This increases the action of the air guide element, in particular if the mixing flap has a small opening degree.

In an embodiment of the air flow control device, the mixing flap can be made with a single arm or as a substantially partition-like device, which in a first end position substantially closes the first inlet opening. This is particularly space-saving and nevertheless enables an effective and stepless regulation of the mixing ratio of warm and cold air as formed in the mixing chamber.

Moreover, the adaption options for the air flow control device expand due to this feature.

In an embodiment of the air flow control device, the air guide element in the area of the upstream section can have a first side and a second side opposite to the first side, and the air guide element in the area of the first side of the upstream section and/or in the area of the second side of the upstream section can have at least one barrier-like element, which extends the first side and/or the second side of the upstream section substantially in the flow direction of the second partial air flow flowing out of the hot air passage into the mixing chamber. This improves the shielding of the third partial air flow, conveyed by the air guide element from the cold air passage through the mixing chamber, from the second partial air flow flowing out of the hot air passage.

In an embodiment of the air flow control device, the at least one barrier-like element can be curved in a plane formed by the flow cross section of the air guide element. This construction strengthens the shielding effect achieved by the at least one barrier-like element.

In an embodiment of the air flow control device, the air guide element can have at least one inflow opening, whose flow cross section is disposed substantially perpendicular to the flow direction of the second partial air flow flowing out of the hot air passage into the mixing chamber.

In an embodiment of the ventilation, heating, or air conditioning unit, at least one air flow control device can be disposed in the ventilation, heating, or air conditioning unit. As a result, a ventilation, heating, or air conditioning unit is provided which produces a constant air flow and thereby increases the feeling of comfort of the vehicle passengers.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

The invention will be described below in greater detail based on at least one exemplary embodiment with reference to the figures in the drawing. In the drawing.

DETAILED DESCRIPTION

Figure 1:
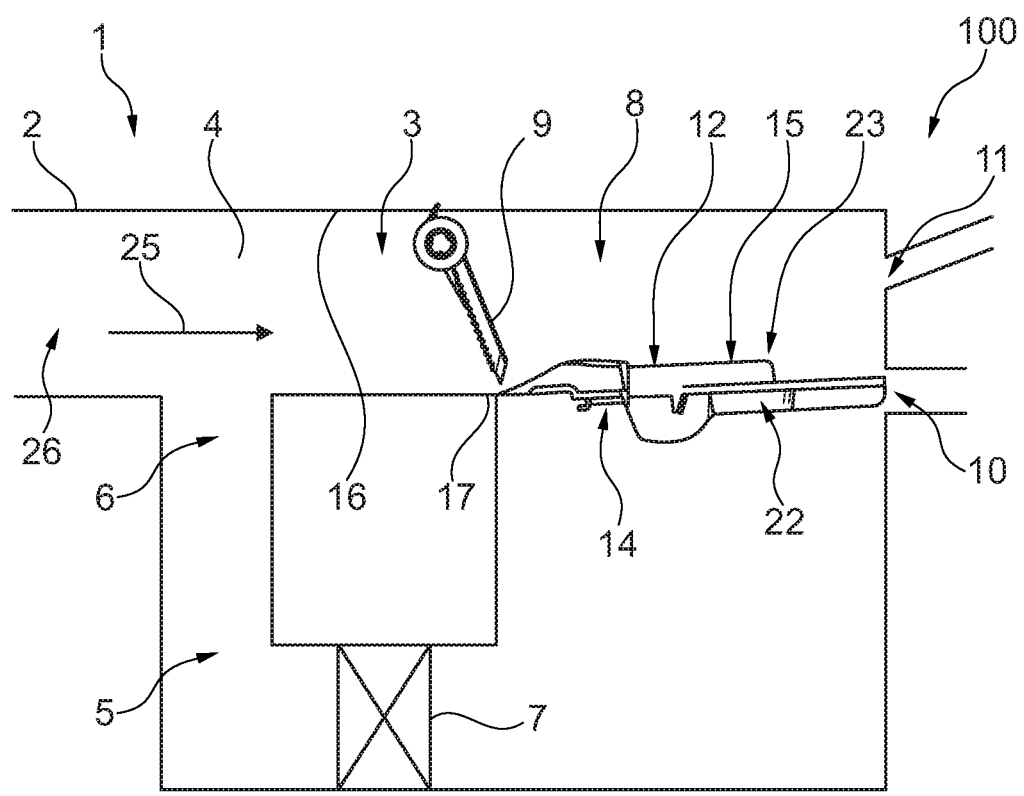
FIG. 1 shows a schematic view of the air flow control device.

An example of an embodiment of air flow control device 1 is illustrated schematically in FIG. 1. Air flow control device 1 is disposed, for example, in a ventilation, heating, or air conditioning unit 100 of a motor vehicle, said unit only being shown schematically. The ventilation, heating, or air conditioning unit to this end has a housing 2 in which air flow control device 1 is disposed.

A fan, disposed, for example, in the area of the ventilation, heating, or air conditioning unit 100 draws in air in particular from a surrounding area or from the motor vehicle interior and conveys this air into housing 2, whereby said air also flows in particular into the area of air flow control device 1.

During the operation of ventilation, heating, or air conditioning unit 100 and also air flow control device 1, the drawn-in air is conveyed in particular into an air supply passage 26 disposed in housing 2. The air flows in air supply passage 26 substantially in an air flow direction 25. Air supply passage 26 supplies a cold air passage 3, disposed downstream of air supply passage 26 in housing 2, and/or a hot air passage 5, disposed in housing 2 downstream of air supply passage 26, with air. To cool the air, an evaporator can be disposed advantageously in cold air passage 3 before the branching off of hot air passage 5.

Cold air passage 3 has a first inlet opening 4 and hot air passage 5 has a second inlet opening 6. The air, flowing in air supply passage 26 substantially in air flow direction 25, flows substantially as a first partial air flow into cold air passage 3 and/or flows as a second partial air flow through second inlet opening 6 into hot air passage 5.

At least one heating heat exchanger 7 is disposed in hot air passage 5. The second partial air flow flowing in hot air passage 5 flows through the at least one heating heat exchanger 7. The second partial air flow is heated during the operation of heating heat exchanger 7.

Cold air passage 3 has a first cold air passage side 16 and a second cold air passage side 17 opposite to first cold air passage side 16. A mixing flap 9 is disposed in the area of first inlet opening 4 in the area of first cold air passage side 16. In the exemplary embodiment of air flow control device 1 as shown in FIGS. 1 to 5, mixing flap 9 is formed as a single-arm wing flap. In alternative embodiments, mixing flap 9 is formed as a substantially partition-like device. This substantially partition-like device may have different design forms in different embodiments of air flow control device 1.

Mixing flap 9, formed as a single-arm wing flap, and/or mixing flap 9, formed as a substantially partition-like device, in a first end position substantially close first inlet opening 4.

A mixing chamber 8 is disposed downstream of cold air passage 3 and downstream of hot air passage 5. The first partial air flow, flowing out of cold air passage 3 into mixing chamber 8, and the second partial air flow, flowing out of hot air passage 5 into mixing chamber 8, mix in mixing chamber 8.

During operation of heating heat exchanger 7, the second partial air flow flowing out of hot air passage 5 into mixing chamber 8 is substantially a hot air flow. The first partial air flow flowing out of cold air passage 3 into mixing chamber 8 during operation of an evaporator, disposed upstream of mixing chamber 8, is substantially a cold air flow. The hot air flow and the cold air flow are mixed in mixing chamber 8.

It is shown by way of example in FIG. 1 that mixing flap 9 is mounted, rotatable about an axis, in the area of at least one mounting point 18. The at least one mounting point 18 is disposed in this case in the area of first cold air passage side 16.

If mixing flap 9 in the first end position substantially closes first inlet opening 4, the first partial air flow, flowing out of cold air passage 3 into mixing chamber 8, is interrupted. In this case, the air, flowing out of supply passage 26, flows substantially totally through second inlet opening 6 into hot air passage 5 and through the at least one heating heat exchanger 7, disposed in hot air passage 5, into mixing chamber 8.

Depending on the rotation angle and/or position of mixing flap 9, the weighting of the amount of air of the first partial air flow, which flows out of cold air passage 3 into mixing chamber 8, and the amount of air of the second partial air flow, which flows out of hot air passage 5 into mixing chamber 8, changes.

In a position of mixing flap 9, in which the air amount of the first partial air flow, flowing out of cold air passage 3 into mixing chamber 8, is at a maximum, the air amount of the second partial air flow, flowing out of hot air passage 5 into mixing chamber 8, is minimal, because heating heat exchanger 7 acts as a flow resistance in hot air passage 5.

Housing 2 has a first outlet opening 10, disposed downstream of mixing chamber 8, and at least one second outlet opening 11, disposed downstream of mixing chamber 8. The air, coming out of the first partial air flow and/or the second partial air flow and mixed in mixing chamber 8 air, flows through first outlet opening 10 and the at least one second outlet opening 11 from mixing chamber 8 in particular into a cabin (not shown) of the motor vehicle.

The temperature of the air, flowing through the at least one second outlet opening 11 into the cabin of the motor vehicle, is dependent in particular on the weighting of the amount of air, flowing out of cold air passage 3 into mixing chamber 8, and the amount of air, flowing out of hot air passage 5 into mixing chamber 8. The weighting of the two amounts of air in this case is controlled by the position or opening degree of mixing flap 9.

Figure 2:
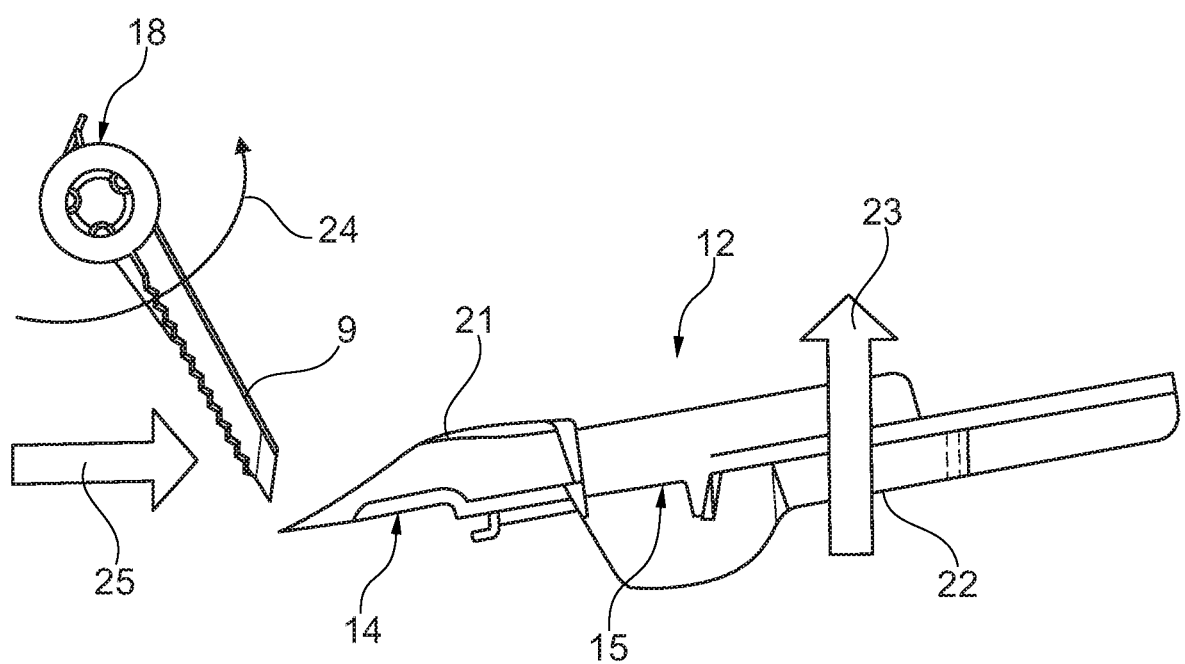
FIG. 2 shows a schematic view of part of the air flow control device according to FIG. 1.
Figure 3:
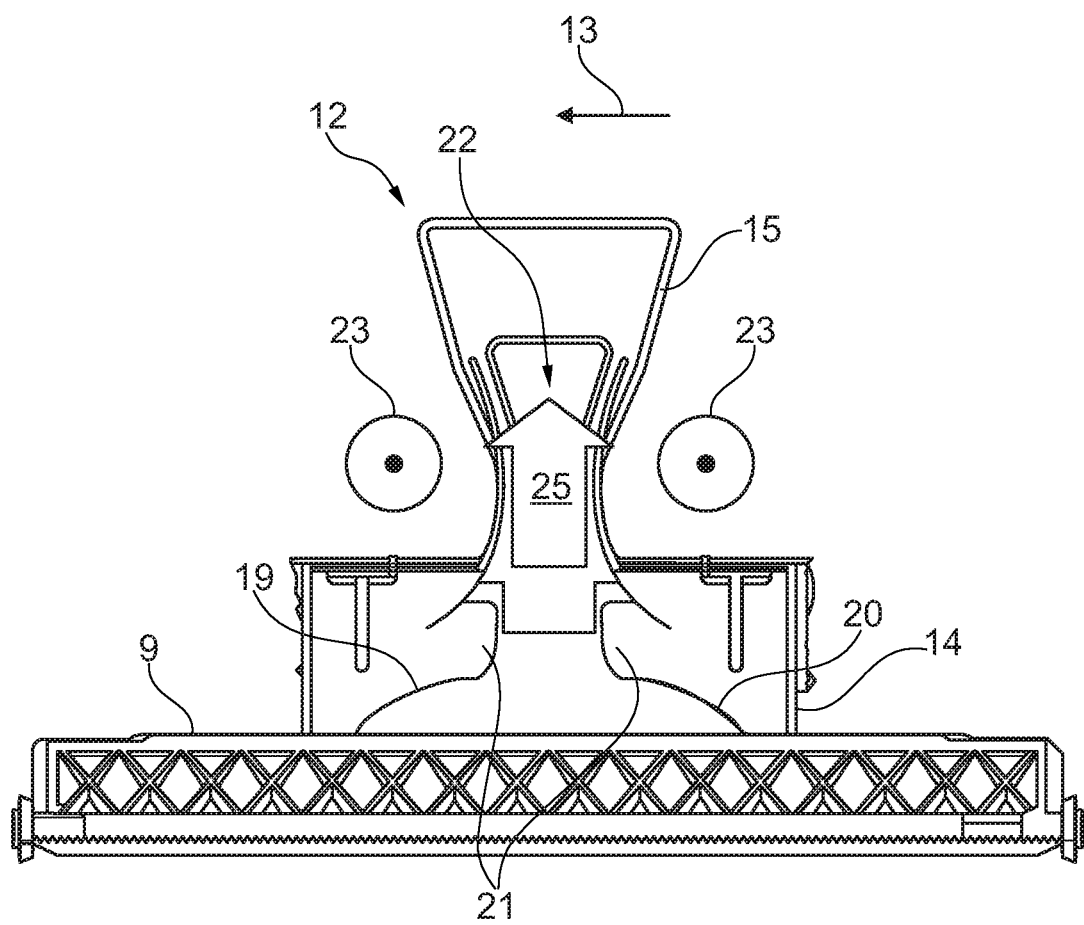
FIG. 3 shows a further schematic view of part of the air flow control device according to FIG. 1.
Figure 4:
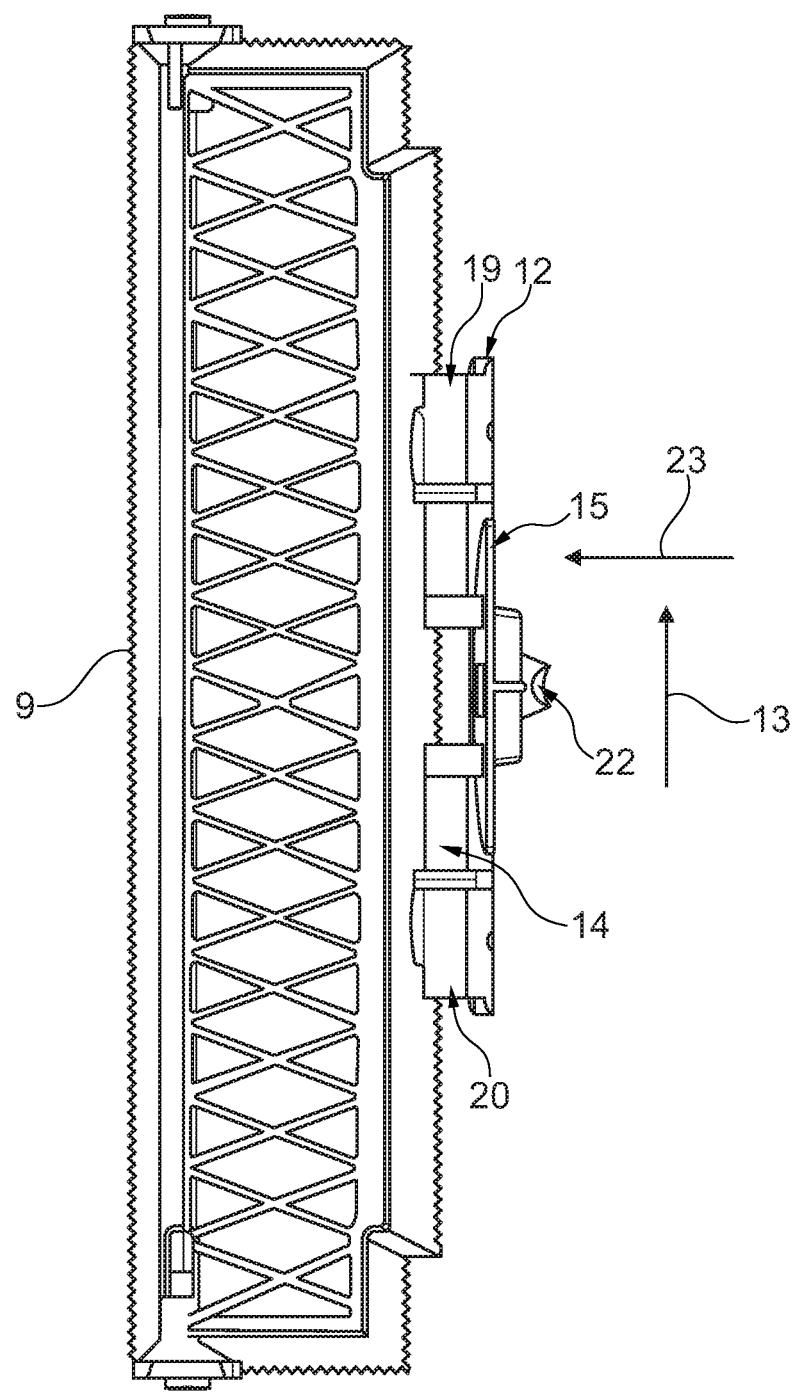
FIG. 4 shows a further schematic view of part of the air flow control device according to FIG. 1.
Figure 5:
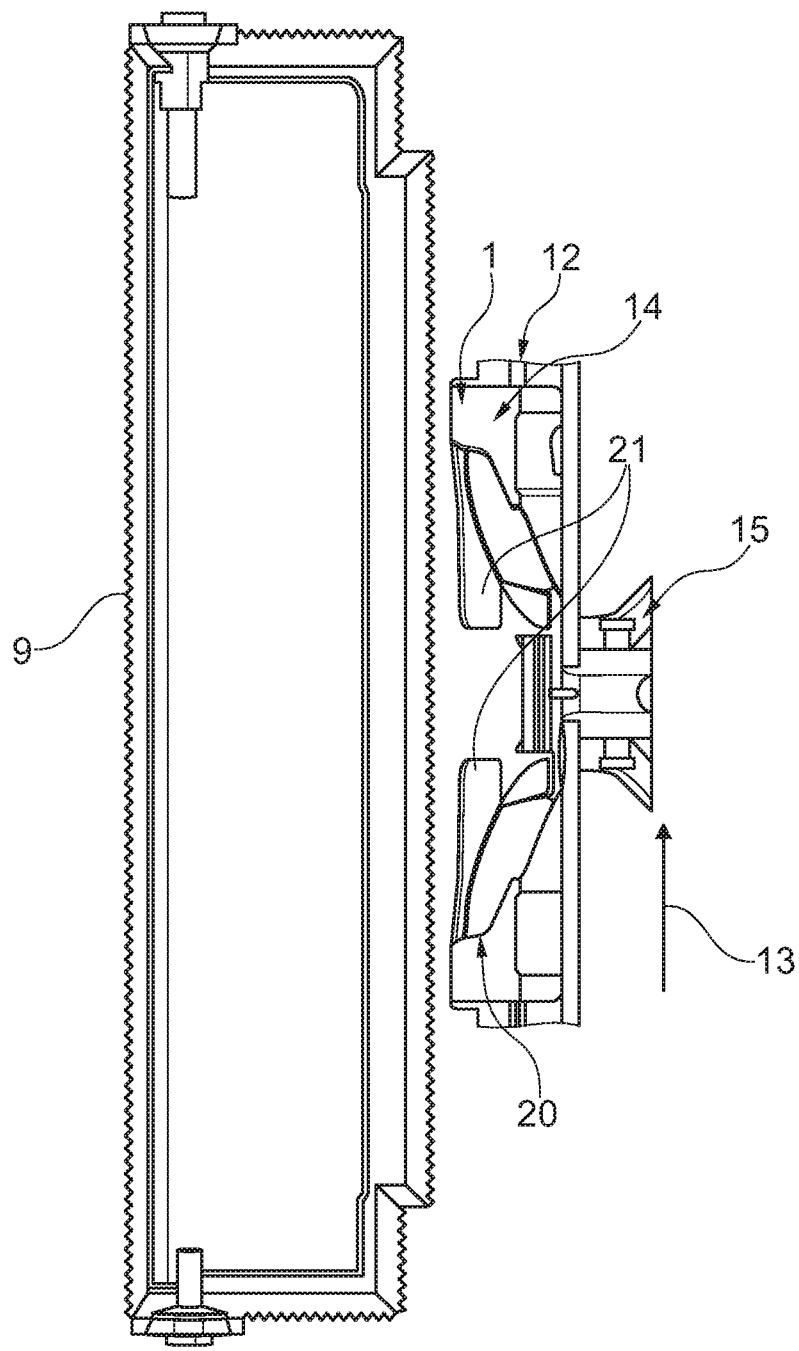
FIG. 5 shows a further schematic view of part of the air flow control device according to FIG. 1.

An air guide element 12 is disposed in the area of first inlet opening 4 in the area of second cold air passage side 17 and/or in an extension of second cold air passage side 17. An exemplary arrangement of air guide element 12 in the area of air flow control device 1 is shown in FIG. 1. A side view of air guide element 12 and mixing flap 9 is shown in FIG. 2. FIG. 3 shows a view of air guide element 12 and mixing flap 9, said view being vertical to air flow direction 25 and opposite to direction 23 of the second partial air flow from hot air passage 5 into mixing chamber 8. A view, taken opposite to air flow direction 25, of air guide element 12 and mixing flap 9 is shown in FIG. 4. FIG. 5 shows a view of air guide element 12 and mixing flap 9, said view taken in direction 23 of the second partial air flow, flowing out of hot air passage 5 into mixing chamber 8.

Air guide element 12 has an upstream section 14 and a downstream section 15 disposed adjacent to upstream section 14. Upstream section 14 of air guide element 12 is disposed substantially in the area of first inlet opening 4 and second cold air passage side 17 and/or in an extension of second cold air passage side 17. Downstream section 15 of air guide element 12 is disposed substantially adjacent to first outlet opening 10 and/or opens into first outlet opening 10.

In this case, air guide element 12 is disposed substantially such that it extends through mixing chamber 8. A (substantially cold) third partial air flow of the first partial air flow, flowing through first inlet opening 4 and around mixing flap 9 out of cold air passage 3 into mixing chamber 8, is substantially branched off by air guide element 12. Said third partial air flow is guided by air guide element 12 substantially perpendicular to the second partial air flow, flowing out of hot air passage 5 into mixing chamber 8, into the area of first outlet opening 10 and/or into first outlet opening 10.

Upstream section 14 of air guide element 12 has a cross section variable in a first direction 13 perpendicular to air flow direction 25. In FIGS. 3 to 5, air guide element 12 is shown in the area of upstream section 14 with a cross section decreasing in first direction 13 perpendicular to air flow direction 25. The cross-section proportions of upstream section 14 can vary in different embodiments.

A decreasing cross-sectional profile substantially acts as a funnel in the area of upstream section 14. As a result, a large portion of the first partial air flow, flowing through first inlet opening 4 and around mixing flap 9 out of cold air passage 3 into mixing chamber 8, is branched off into the third partial air flow. The proportion of the amount of air of the first partial air flow, which is branched off in the third partial air flow, is especially high at an opening degree of mixing flap 9 which corresponds to a percentage of the maximum opening degree of mixing flap 9 of about 1 to 15%.

The air branched off the first partial air flow into the third partial air flow is taken up in the area of first inlet opening 4 and second cold air passage side 17 and/or in the area of an extension of second cold air passage side 17 by upstream section 14 of air guide element 12 and is guided via downstream section 15 of air guide element 12 into the area of first outlet opening 10 and/or into first outlet opening 10. Therefore, colder air is conveyed into the cabin of the motor vehicle via the first outlet opening 10 than via the at least one second outlet opening 11.

In FIGS. 3 to 5, air guide element 12 in the area of downstream section 15 is shown with a cross section increasing in first direction 13 perpendicular to air flow direction 25. The cross-sectional proportions of downstream section 15 can vary in different embodiments.

Air guide element 12 in the exemplary embodiment shown in FIGS. 1 to 5 has an inflow opening 22. Inflow openings 22 in different embodiments can be disposed in upstream section 14 and/or in downstream section 15. In this case, inflow openings 22 are disposed such that their flow cross section is disposed substantially vertical to flow direction 23 of the second partial air flow flowing out of hot air passage 5 into mixing chamber 8. Air flows through inflow openings 22 out of the second partial air flow substantially through air guide element 12 into mixing chamber 8.

In the area of upstream section 14, air guide element 12 has a first side 19 and a second side 20 opposite to first side 19. In the exemplary embodiment shown in FIGS. 1 to 5, two barrier-like elements 21 are disposed in the area of first side 19 and second side 20. Barrier-like elements 21 in this case extend substantially in flow direction 23 of the second partial air flow flowing out of hot air passage 5 into mixing chamber 8. In this case, barrier-like elements 21 extend first side 19 and/or second side 20 of upstream section 14 of air guide element 12.

In alternative embodiments, the number and design of barrier-like elements 21 can vary. One or more than one barrier-like element 21 can also be disposed in the area of first side 19 and/or in the area of second side 20.

In the exemplary embodiment shown in FIGS. 1 to 5, the two barrier-like elements 21 are curved in a plane formed by the flow cross section of air guide element 12. In various embodiments, the type of curvature, in particular the degree of curvature, can vary.

In alternative embodiments, upstream section 14 and/or downstream section 15 can have barrier-like elements 21.

Alternatively, barrier-like elements 21 can also be designed such that they form a substantially tubular structure in the area of air guide element 12.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An air flow control device for a ventilation, heating, or air conditioning unit of a motor vehicle, the device comprising:
 a housing with a cold air passage with a first inlet opening and with a hot air passage with a second inlet opening;
 at least one heating heat exchanger arranged in the hot air passage to heat the air in the hot air passage;
 a mixing chamber for mixing a first partial air flow from the cold air passage and a second partial air flow from the hot air passage, the mixing chamber being arranged downstream of the hot air passage and of the cold air passage;
 a mixing flap, the mixing flap in a first end position substantially closing the first inlet opening, wherein the housing downstream of the mixing chamber has a first outlet opening and at least one second outlet opening for the flowing of air out of the mixing chamber; and
 an air guide element arranged in an area of the mixing chamber, the air guide element substantially extending through the mixing chamber and guiding a third partial air flow from the cold air passage to the first outlet opening,
 wherein the air guide element, in the area of the mixing chamber, is arranged substantially perpendicular to the second partial air flow flowing out of the hot air passage into the mixing chamber,
 wherein the cold air passage has a first cold air passage side and a second cold air passage side substantially opposite to the first cold air passage side,
 wherein the first cold air passage side and the second cold air passage side are inner side surfaces of the cold air passage,
 wherein the air guide element is an extension of the second cold air passage side, such that a distal end of an upstream section of the air guide element directly contacts and extends from the second cold air passage side of the cold air passage, and a distal end of a downstream section of the air guide element terminates directly at the first outlet opening,
 wherein the air guide element is formed such that the third partial air flow flows over an upper exterior surface of the air guide element, and the air guide element is arranged in the area of the mixing chamber, such that the third partial air flow includes a portion of the first partial air flow that has flowed past the mixing flap and into the mixing chamber,
 wherein an entirety of cold air supplied to and exiting from the first outlet opening and the at least one second outlet opening first flows through the first inlet opening, such that the mixing flap, when in the first end position, interrupts blocks the entirety of cold air from being supplied to and exiting from the first outlet opening and the at least one second outlet opening, and
 wherein the housing is provided with a single passage for supplying cold air to the first outlet opening and the at least one second outlet opening, the single passage being the cold air passage, and wherein the mixing flap is positioned inside of the cold air passage.

2. The air flow control device according to claim 1, wherein the air guide element has a cross section that varies along a first direction substantially perpendicular to an air flow direction.

3. The air flow control device according to claim 2, wherein the air guide element in an area of the upstream section has a cross section decreasing in a first direction substantially perpendicular to an air flow direction.

4. The air flow control device according to claim 1, wherein the air guide element in the area of the downstream section has a cross section that is substantially constant or widens or narrows in a first direction substantially perpendicular to an air flow direction.

5. The air flow control device according to claim 1, wherein the mixing flap is disposed, mounted rotatable about an axis in an area of at least one mounting point.

6. The air flow control device according to claim 5, wherein the at least one mounting point is disposed in the area of the first cold air passage side.

7. The air flow control device according to claim 1, wherein the mixing flap is made as a single-arm flap or as a substantially partition-like device, which in a first end position substantially closes the first inlet opening.

8. The air flow control device according to claim 1, wherein the air guide element in an area of the upstream section has a first side and a second side opposite to the first side, wherein the air guide element in the area of the first side of the upstream section and in the area of the second side of the upstream section has at least one barrier-like element, which extends the first side and the second side of the upstream section substantially in a flow direction of the second partial air flow flowing out of the hot air passage into the mixing chamber, and wherein the at least one barrier-like element is a tab or projection.

9. The air flow control device according to claim 8, wherein the at least one barrier-like element is curved in a plane formed by a flow cross section of the air guide element.

10. The air flow control device according to claim 1, wherein the air guide element has at least one inflow opening, whose flow cross section is disposed substantially perpendicular to the flow direction of the second partial air flow flowing out of the hot air passage into the mixing chamber.

11. A ventilation, heating, or air conditioning unit, wherein at least one air flow control device according to claim 1 is disposed in the ventilation, heating, or air conditioning unit.

12. The air flow control device according to claim 1, wherein the downstream section of the air guide element has a narrowed portion connected to the upstream section and an expanded portion that is downstream of the narrowed portion in an air flow direction along the upper exterior surface of the air guide element, and wherein the expanded portion is wider than the narrowed portion, such that the downstream section of the air guide element narrows at a position where the narrowed portion connects to the upstream section of the air guide element and then expands to the expanded portion in the air flow direction, and
 wherein the air guide element has at least one inflow opening for the second partial air flow from the hot air passage.

* * * * *